UNITED STATES PATENT OFFICE.

HENRY A. GARDNER, OF WASHINGTON, DISTRICT OF COLUMBIA.

METHOD OF RENDERING WOOD FIRE-RESISTING.

1,148,013.  Specification of Letters Patent.  Patented July 27, 1915.

No Drawing.  Application filed November 6, 1913.  Serial No. 799,591.

*To all whom it may concern:*

Be it known that I, HENRY A. GARDNER, a citizen of the United States, residing at Washington, in the District of Columbia, have invented certain new and useful Improvements in Methods of Rendering Wood Fire-Resisting, of which the following is a specification.

This invention relates to methods of rendering combustible articles fire-resisting.

The invention is particularly intended for providing wooden shingles or the like with a fire-resisting coating which, according to the purpose sought, may either be opaque, or of such nature as to exhibit the grain and surface character of the wood.

It is well known that aqueous solutions of silicates of the alkali metals are decomposed even by weak acids, such as carbon dioxid. I have now found that silica may be precipitated from aqueous solutions of sodium or potassium silicate by reacting thereon with acids of the fatty type, whether saturated or unsaturated, the precipitate consisting initially of hydrated silica in a dense form, and possessing special value as a fire-resisting coating. The acid used as the precipitant for the silica enters into combination with the alkali metal, forming therewith water-soluble soaps.

The following are certain illustrative examples in accordance with my invention, it being understood that the invention is not restricted to the proportions or methods of manipulation therein set forth.

In case an opaque coating is desired, I incorporate a refractory mineral pigment, preferably finely comminuted asbestos or a mixture thereof with a mineral color, as iron oxid or the like, with a solution of sodium silicate, having for example a concentration of 15 to 30° Baumé. The mineral pigment is added and thoroughly incorporated in proportion to bring the mixture to proper paint consistence. This silicate paint is then applied to the wood by brushing, dipping, or spraying, and is preferably permitted to dry for some hours, forming an adherent coating. I then apply over this coating a suitable paint, preferably a waterproof paint, consisting of a mineral pigment, an appropriate vehicle as linseed oil or the like, and an acid of the fatty type, for example oleic acid. The oleic acid may be used in varying proportions, but for the best results the quantity added should be such as to impart to the vehicle as a whole an acid number of at least 10; and I prefer to introduce it in considerably higher proportions than this. The acid decomposes the silicate first applied to the wood, or completes its decomposition, precipitating the silica upon and between, and possibly within, the fibers of the wood. In this way, the wood is rendered highly fire-resisting, and is likewise very effectively protected from moisture and decay. The fire-resisting effect of the precipitated silica is supplemented by that of the mineral pigments carried by both the first and second coats.

In case it is desired to display the grain and surface character of the wood, the silicate solution is applied clear, and is followed, preferably after drying, by a clear solution containing the acid of the fatty type, as oleic acid, dissolved in any suitable solvent, as for example linseed or other saponifiable oil. Under these conditions, the silica is precipitated as before, but the surface character of the wood is not completely masked, even when high concentrations of silicate are used.

Pleasing effects are obtained by the use of clear solutions as above described, and such effects may be varied to some extent by altering the concentration of the sodium silicate solution employed. The effect may be further modified by the use in conjunction with the silicate solution, or with the precipitant, of suitable dyes of alkali-resisting character, as for example anilin stains, to secure any desired color.

The sodium or potassium silicate in the above examples may be replaced either wholly or partially by the corresponding aluminates which undergo similar reaction with free acids of the fatty type with precipitation of alumina. The aluminates are therefore to be regarded, for the purposes of this invention, as equivalent to the silicates.

I claim:—

1. The method of treating wood to render it fire-resisting, which consists in applying to the surface thereof a coating containing a soluble silicate or aluminate, and thereafter treating said coating with a waterproofing substance capable of decomposing the same.

2. The method of treating wood to render it fire-resisting, which consists in applying to the surface thereof a coating containing a soluble silicate or aluminate, and thereafter treating said coating with a waterproofing substance containing a water-insoluble organic acid capable of decomposing said silicate or aluminate.

3. The method of treating wood to render it fire-resisting, which consists in applying to the surface thereof a coating containing a soluble silicate or aluminate, and thereafter treating said coating with a waterproofing substance containing oleic acid.

In testimony whereof I affix my signature in presence of two witnesses.

HENRY A. GARDNER.

Witnesses:
 JAS. H. BLACKWOOD,
 C. P. TOWNSEND.